P. E. MURPHY.
PLASTERER'S OR PAINTER'S SCRAPING PAN.
APPLICATION FILED AUG. 26, 1910.
1,078,944.
Patented Nov. 18, 1913.
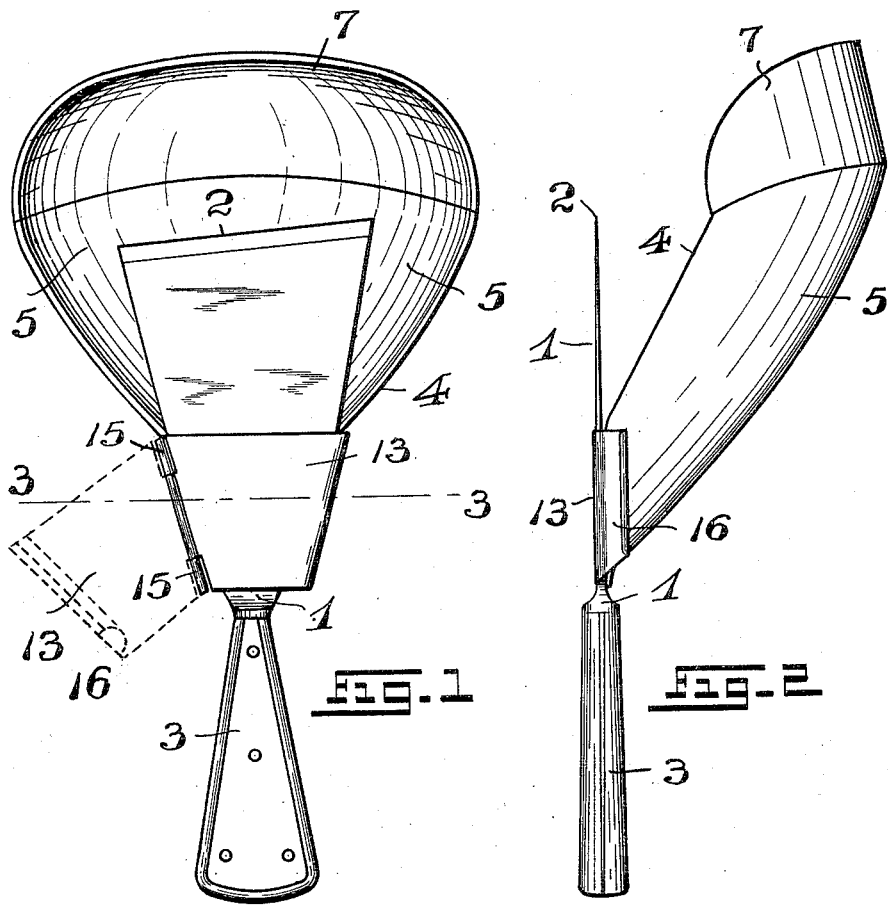
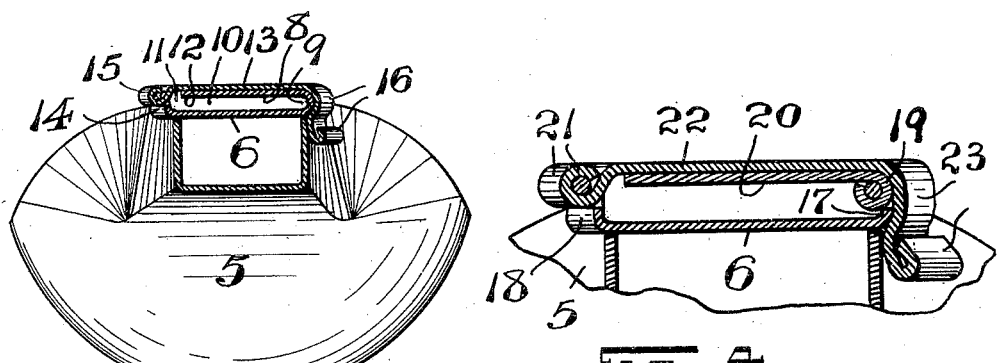
WITNESSES:
Fredk H. W. Fraentzel
Harry C. Pfeiffer
INVENTOR:
Peter E. Murphy,
BY Fraentzel and Richards,
ATTORNEYS
COLUMBIA PLANOGRAPH CO., WASHINGTON, D. C.

UNITED STATES PATENT OFFICE.

PETER E. MURPHY, OF NEWARK, NEW JERSEY.

PLASTERER'S OR PAINTER'S SCRAPING-PAN.

1,078,944.  Specification of Letters Patent.  Patented Nov. 18, 1913.

Application filed August 26, 1910. Serial No. 579,142.

*To all whom it may concern:*

Be it known that I, PETER E. MURPHY, a citizen of the United States, residing at Newark, in the county of Essex and State of New Jersey, have invented certain new and useful Improvements in Plasterers' or Painters' Scraping-Pans; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in tools or implements for the use of plasterers and painters; and, the present invention relates, more particularly, to a novel receiving or catch-pan adapted for use especially with plasterers' or painters' scraping tools used in removing paint, sizing, plaster, and the like, from walls, ceilings, and other surfaces, and all such other uses to which scraping tools may be put.

The present invention has for its principal object to provide a novel and simply constructed catch or receiving pan which may be attached to or is provided with a plasterer's or painter's scraping tool, the receiving or catch-pan being arranged with relation to the scraping tool, in such a manner, so that when the same is in use, the debris which is removed from the wall, ceiling, or other surface, by means of the scraping tool, will be caught by and retained in the receiving or catch-pan, thereby avoiding all the litter and dirt-accumulation which accompanies the use of the ordinary scraping tools.

The invention has for its further object to provide a novel receiving or catch-pan for use with scraping tools and of the general character hereinafter set forth, which can be readily used upon ceilings and walls with like effect in catching and retaining the debris or removed particles directly within the receiving or catch-pan, so that such particles will not fall upon the floor or carpet.

A further object of this invention is to provide such receiving or catch-pan with a simply constructed and readily manipulated holding or retaining means for detachably securing the receiving or catch-pan in its operative combination or arrangement with relation to a scraping tool, such as is used by plasterers and painters; or, in fact, with any other tool, device, or implement with which the pan may be used.

Other objects of this invention not at this time more particularly enumerated will be clearly understood from the following detailed description of the present invention.

With the various objects of this invention in view, the said invention consists, primarily, in the novel plasterer's or painter's receiving or catch-pan for scraping tools, and the like, hereinafter set forth; and, the invention consists, furthermore, in the novel arrangements and combinations of the various devices and parts, as well as in the details of the construction of the same, all of which will be more fully described in the following specification, and then finally embodied in the clauses of the claim which are appended to and which form an essential part of this specification.

The invention is clearly illustrated in the accompanying drawings, in which:—

Figure 1 is a front or face view of a plasterer's or painter's receiving or catch-pan for scraping tools embodying the principles of the present invention, and said view showing in connection therewith the usual form of scraping tool with which the pan may be used; and Fig. 2 is a side elevation of the various devices and parts represented in said Fig. 1. Fig. 3 is a transverse vertical section of the device, said section being taken on line 3—3 in said Fig. 1, the scraping tool, however, being omitted from said view. Fig. 4 is a similar transverse vertical section, drawn on an enlarged scale, and illustrating a slightly modified means whereby the receiving or catch-pan can be arranged and held in its operative connection with a scraping or other tool, the scraping tool being also omitted from this view.

Similar characters of reference are employed in all of the above described views, to indicate corresponding parts.

Referring now to the several figures of the drawings, the reference-character 1 indicates any suitably formed scraping blade which is provided with the usual scraping edge 2, and is further provided with the usual form of handle or grip-portion 3.

The reference-character 4 indicates one form of plasterer's or painter's receiving or catch-pan, showing one embodiment of the principles of the present invention, the said pan being adapted to be connected and used with the said scraping blade herein-above mentioned. The said receiving or catch-pan is preferably formed with a scoop-shaped or bellied body, as 5, having at its lower extremity a wall-portion or member 6 adapted to conform with the conformation or shape of the blade of the scraping tool against which it is adapted to be arranged. As illustrated in said Figs. 1 and 2 of the drawings, the said scoop-shaped or bellied portion 5 of the pan extends rearwardly and slightly outwardly from the plane of the blade of the scraping tool, so as to incline away from the said blade, but at the same time, the said portion 5 is made with outwardly flaring or spread-out parts, so as to surround all points directly beneath the scraping edge of the scraping tool. The said scoop-shaped or bellied portion 5 is also provided at its outer extremity with an inwardly extending flange-like catching element 7 which forms in conjunction with the said bellied portion 5, the cup or pan-like receiving member or chamber which is adapted to catch the debris removed from the surface over which the scraper is operated, when such surface is in a horizontal plane, such for example, as a ceiling. When, however, the scraping tool, together with the receiving or catch pan connected therewith, is operated upon a vertical surface, such as a side-wall, the debris removed by the scraping edge 2 flies against the bellied portion 5 and then drops down into the pocket formed by the conjunction of the lower extremity of the bellied portion 5 with the wall-portion or member 6, and is there retained. One means for operatively combining or arranging the said receiving or catch-pan, herein-above described, in its operative relation with the said blade 1 of the scraping tool, consists, essentially, of a plate-like member or extension 8 which is formed with a curved portion 9, at one of the longitudinal edges. The said plate-like member or extension 8, as shown and as will be understood from an inspection of the figures of the drawings, forms in conjunction with the said wall-portion or member 6 a suitable receiving and holding socket 10 for the reception of the blade 1, the longitudinally extending opening or space, as 11, which is located between the marginal edge 12 of the plate-like member or extension 8 and the said wall-portion or member 6, providing a suitable passage-way or opening for the insertion or removal of the blade 1 into and from the said receiving socket 10. In order to retain the blade of the scraping tool in its operative relation and arrangement in said receiving socket, there is provided a closure or gate-like member or element, as 13, the same being suitably connected with the marginal edge 14 of the wall-portion or member 6 by means of a suitably formed hinge-portion, as 15. Having inserted the blade 1 of the scraping tool in the said receiving socket 10, the said closure or gate-like member or element 13 is closed down so as to extend across said opening 11, herein-before mentioned, the said closure or gate-like member or element 13 extending also across and registering with the said plate or extension-member 8. At its free edge-portion, the said closure or gate-like member 13 is provided with a spring-like catch or latch-portion, as 16, which is adapted to be sprung over the said previously mentioned edge-portion 9, and thereby brought into clamping engagement with said edge-portion, so as to positively retain or hold the said closure or gate-like member in its closed position, and thereby guarding against any accidental displacement of the scraping blade from the holding portion of the said receiving or catch-pan, as will be clearly understood.

Referring now more particularly to Fig. 4 of the drawings, there is shown therein a slightly modified form of means for operatively combining and arranging the blade of a scraping tool in its operative relation with the receiving or catch-pan 4. In this construction, the said wall-portion or member 6 is provided with the respective longitudinally extending marginal edge-portions forming outwardly turned flanges 17 and 18, respectively, between which the said blade 1 is inserted. Secured to one of said flanges, as 17, by means of a hinge-portion 19, is an inner closure or gate-like member or element 20, adapted to extend across the face of the blade 1 when the same is placed against the wall-portion or member 6; and, in a like manner, there is secured to said flange 18, by means of a hinge-portion 21, an outer closure or gate-like member or element 22, which is adapted to close over the outside of the said first mentioned closure or gate-like member 20. The said closure or gate-like member 22 is provided at its free edge-portion with a spring-like catch or latch-portion 23 which is adapted to be sprung or forced over said hinge-portion 19 of the closure or gate-like member 20 and the flange 17, and thereby retains both of said closures or gate-like members 20 and 22 in their embracing and holding or retaining relation with the said blade 1, whereby the latter and the said receiving or catch-pan 4 are operatively connected with relation to each other.

It will be clearly evident from the foregoing description, that by means of the present invention I have provided a novel, simple and easily operated tool for the purposes stated, the scraping tool or blade being easily attached and detached from the scoop-shaped receiving or catch-pan. It will also be evident from the present invention, that my novel form of receiving or catch-pan may also be used with other suitable tools, implements, or devices, which when put in use produce objectionable particles or debris which it is desired to prevent from falling upon the floor, or the like.

I claim:

1. A receiving pan for the use of plasterers or painters, consisting of a scoop-shaped body provided at its one extremity with a blade-receiving or holding socket comprising a wall-portion or member conforming to the shape of a blade of a scraping tool, the scoop-shaped portion of the pan extending rearwardly and slightly outwardly from the plane of the blade of the scraping tool, so as to provide a bellied portion which inclines away from the said blade, said bellied portion being also provided at its outer extremity with an inwardly extending flange-like catching element, a hinged closure connected with said scoop-shaped body at one side of the said blade-receiving or holding socket, and means connected with said hinged closure for bringing the same in its closed or holding relation over said receiving or holding socket, substantially as and for the purposes set forth.

2. A receiving pan for the use of plasterers or painters, consisting of a scoop-shaped body provided at its one extremity with a blade-receiving or holding socket, and a hinged closure connected with said scoop-shaped body at one side of the said blade-receiving or holding socket, said wall-portion being formed at one edge with a curved portion, and the said closure being provided with a spring-like latch-portion adapted to be sprung over the curved portion of said wall-portion and in separable engagement therewith, so as to lock said closure in place, substantially as and for the purposes set forth.

In testimony, that I claim the invention set forth above I have hereunto set my hand this 24th day of August, 1910.

PETER E. MURPHY.

Witnesses:
FREDK. C. FRAENTZEL,
FREDK. H. K. FRAENTZEL.

Copies of this patent may be obtained for five cents each, by addressing the "Commissioner of Patents, Washington, D. C."